US008429199B2

(12) United States Patent
Wang et al.

(10) Patent No.: US 8,429,199 B2
(45) Date of Patent: Apr. 23, 2013

(54) LOAD ON DEMAND NETWORK ANALYSIS

(75) Inventors: Cheng-Hua Wang, Bedford, NH (US); Huiling Gong, Nashua, NH (US)

(73) Assignee: Oracle International Corporation, Redwood Shores, CA (US)

( * ) Notice: Subject to any disclaimer, the term of this patent is extended or adjusted under 35 U.S.C. 154(b) by 307 days.

(21) Appl. No.: 11/897,704

(22) Filed: Aug. 31, 2007

(65) Prior Publication Data
US 2009/0063516 A1 Mar. 5, 2009

(51) Int. Cl.
*G06F 7/00* (2006.01)
*G06F 17/30* (2006.01)

(52) U.S. Cl.
USPC .......................................... 707/802; 707/812

(58) Field of Classification Search .................. None
See application file for complete search history.

(56) References Cited

U.S. PATENT DOCUMENTS

| | | | | | |
|---|---|---|---|---|---|
| 5,812,549 | A | * | 9/1998 | Sethu ............................ | 370/389 |
| 6,363,495 | B1 | * | 3/2002 | MacKenzie et al. ............... | 714/4 |
| 6,415,286 | B1 | * | 7/2002 | Passera et al. ......................... | 1/1 |
| 6,665,684 | B2 | | 12/2003 | Zait et al. | |
| 6,744,769 | B1 | * | 6/2004 | Siu et al. .................. | 370/395.32 |
| 6,931,390 | B1 | | 8/2005 | Zait et al. | |
| 6,957,225 | B1 | | 10/2005 | Zait et al. | |
| 6,965,891 | B1 | | 11/2005 | Jakobsson et al. | |
| 7,020,661 | B1 | | 3/2006 | Cruanes et al. | |
| 7,299,239 | B1 | | 11/2007 | Basu et al. | |
| 7,400,327 | B1 | * | 7/2008 | Van Dyke et al. ............. | 345/531 |
| 7,539,697 | B1 | * | 5/2009 | Akella et al. ................... | 707/102 |
| 7,664,823 | B1 | * | 2/2010 | Wakerly ......................... | 709/211 |
| 7,672,778 | B1 | * | 3/2010 | Elliott ............................ | 701/417 |
| 7,979,439 | B1 | * | 7/2011 | Nordstrom et al. ............ | 707/741 |
| 2004/0172387 | A1 | * | 9/2004 | Dexter et al. ...................... | 707/3 |
| 2004/0210630 | A1 | * | 10/2004 | Simonnet et al. ............. | 709/203 |
| 2005/0038533 | A1 | * | 2/2005 | Farrell et al. ....................... | 700/73 |
| 2005/0071803 | A1 | * | 3/2005 | Cherdron et al. ............. | 717/101 |
| 2005/0097108 | A1 | * | 5/2005 | Wang et al. .................... | 707/100 |
| 2005/0165788 | A1 | * | 7/2005 | Yang et al. ....................... | 707/10 |
| 2006/0059166 | A1 | * | 3/2006 | Sieffert et al. ................... | 707/10 |
| 2007/0070890 | A1 | * | 3/2007 | Rojahn ......................... | 370/229 |
| 2007/0203910 | A1 | * | 8/2007 | Ferguson et al. .................. | 707/8 |
| 2008/0005072 | A1 | * | 1/2008 | Meek et al. ........................ | 707/3 |
| 2008/0052378 | A1 | * | 2/2008 | Matsuyama et al. .......... | 709/218 |
| 2008/0052379 | A1 | * | 2/2008 | Matsuyama et al. .......... | 709/218 |
| 2008/0243949 | A1 | * | 10/2008 | Anguelov ...................... | 707/204 |
| 2008/0288596 | A1 | * | 11/2008 | Smith et al. ................... | 709/206 |
| 2008/0301757 | A1 | * | 12/2008 | Demarest et al. ................. | 726/1 |
| 2009/0012932 | A1 | * | 1/2009 | Romem et al. .................... | 707/2 |

OTHER PUBLICATIONS

Michele Cyran et al., Oracle Database Concepts, 10g Release 2 (10.2) B14220-02, Oct. 2005, pp. 18-1 to 18-14, Oracle International Corporation, Redwood Shores, CA.

\* cited by examiner

*Primary Examiner* — Cheryl Lewis
*Assistant Examiner* — Raheem Hoffler
(74) *Attorney, Agent, or Firm* — Kraguljac Law Group LLC (57) ABSTRACT

Systems, methodologies, media, and other embodiments associated with load on demand network analysis are described. One method embodiment includes accessing a network analysis request and data associated with a set of network partitions associated with a network. The request describes a function to be performed on the network. A set of partitions subdivides the network and a data model stores data describing the network and its partitions. Thus, the example method may include identifying a member of the set of network partitions associated with the network analysis request and selectively loading data associated that member. The method may then perform the network analysis function on the data associated with the member rather than on data describing the entire network.

22 Claims, 5 Drawing Sheets

LOAD ON DEMAND NETWORK ANALYSIS

BACKGROUND

Various applications may be modeled as network problems. For example, applications in different disciplines including geographic information systems, social sciences, life sciences, and so on, may be modeled as network problems. Different conventional tools can be used to analyze networks and network problems. These tools use two conventional approaches for network analysis. Both of these conventional approaches may have issues that lead to certain limitations. For example, a first conventional approach involves pre-loading an entire network into memory before analyzing the network. This approach may suffer and even fail if the amount of data describing the network exceeds the available memory capacity.

A second conventional approach involves pre-computing all possible analysis results for a network and then storing the analysis results. Later arriving analysis requests are then satisfied by consulting the pre-computed data. However, this approach is time consuming and impractical for large networks. This approach is particularly impractical for large dynamic networks. To provide up-to-date results, a network must be constantly monitored and the pre-computed results re-computed upon detecting any change in the network.

A network is a graph representation for modeling objects of interest and their relationships. A network has nodes, links, and paths. A node may model an object of interest. A link may model a relationship between two nodes. A path may model an ordered list of connected links. Data structures may be populated with data associated with nodes, links, and paths. Thus, a network may be associated with a network data model. A data model may include, for example, network metadata, a node table, a link table, a path table, and so on. In one conventional approach, before any network analysis is performed, all this data must be loaded into memory.

A network model may also provide analysis functions. For example, a network model may provide a shortest path function, an all paths function, a connected components function, a within-cost function, a nearest-neighbor function, a minimum cost spanning tree function, and so on. In one conventional approach, results for these functions may be pre-computed and stored to satisfy later arriving analysis requests. However, if the network has changed between the time the results were computed and the time the request arrives, then the results will be out-of-date and may have to be recomputed.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DETAILED DESCRIPTION

A network is a graph representation for modeling objects of interest and their relationships. A network has nodes, links, and paths. Data structures may be populated with data associated with nodes, links, and paths. The data, data structures, relationships, and so on, may be described in a network data model. A network data model may include, for example, network metadata, a node table, a link table, a path table, and so on. Example systems and methods may augment a conventional data model with additional information to facilitate loading a network partition on demand. The additional information may include, for example, a partition table and partition identifier entries. Thus, partition information may be added to a database.

Example systems and methods interact with a network data model (NDM). In one example, the network data model is the Oracle NDM. Unlike conventional approaches, example systems and methods facilitate analyzing a network without pre-loading the entire network and without pre-computing all desired analysis results. Example systems and methods work on subsets (e.g., partitions) of a network. The subset processing may include creating partitions, automatically discovering relevant network partitions (e.g., groupings), maintaining partitions, and so on. With relevant partitions identified, example systems and methods may dynamically load and unload partitions during analysis on an as-needed basis. When partitions are loaded, they may be cached in memory according to a user-configurable caching policy. The policy may define, for example, the size of the cache and a cache replacement policy (e.g., least recently used, most recently used).

The following includes definitions of selected terms employed herein. The definitions include various examples and/or forms of components that fall within the scope of a term and that may be used for implementation. The examples are not intended to be limiting. Both singular and plural forms of terms may be within the definitions.

"Computer-readable medium", as used herein, refers to a storage medium that stores instructions and/or data. A computer-readable medium may take forms, including, but not limited to, non-volatile media, and volatile media. Non-volatile media may include, for example, optical or magnetic disks, and so on. Volatile media may include, for example, semiconductor memories, dynamic memory, and so on. Common forms of a computer-readable medium include, but are not limited to, a floppy disk, a flexible disk, a hard disk, a magnetic tape, other magnetic medium, a CD-ROM, other optical medium, a RAM, a ROM, an EPROM, a FLASH-EPROM, or other memory chip or card, a memory stick, and other media from which a computer, a processor or other electronic device can read.

"Logic", as used herein, includes but is not limited to hardware, firmware, software stored on a computer-readable medium or in execution, and/or combinations of each to perform a function(s) or an action(s), and/or to cause a function or action from another logic, method, and/or system. Logic may include a software controlled microprocessor, discrete logic (e.g., an application specific integrated circuit (ASIC)), an analog circuit, a digital circuit, a programmed logic device, a memory device containing instructions, and so on. Logic may include a gate(s), combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, and/or logical communications may be sent and/or received. Typically, an operable connection includes a physical interface, an electrical interface, and/or a data interface, but it is to be noted that an operable connection may include differing combinations of these or other types of connections sufficient to allow operable control. For example, two entities can be operably connected by being able to communicate signals to each other directly or through one or more intermediate entities (e.g., processor, operating system, logic, software). Logical and/or physical communication channels can be used to create an operable connection.

"Signal", as used herein, includes but is not limited to one or more electrical or optical signals, analog or digital signals, data, one or more computer or processor instructions, messages, a bit or bit stream, or other means that can be received, transmitted and/or detected.

"Software", as used herein, includes but is not limited to, one or more computer or processor instructions that cause a computer, processor, or other electronic device to perform functions, actions and/or behave in a desired manner. The instructions may be embodied in various forms including routines, algorithms, modules, methods, threads, and/or programs including separate applications or code from dynamically linked libraries. Software, whether an entire system or a component of a system, may be embodied as an article of manufacture and maintained or provided as part of a computer-readable medium as defined previously.

"User", as used herein, includes but is not limited to one or more persons, software, computers or other devices, or combinations of these.

Some portions of the detailed descriptions that follow are presented in terms of algorithms and symbolic representations of operations on data bits within a memory. These algorithmic descriptions and representations are the means used by those skilled in the art to convey the substance of their work to others. An algorithm is here, and generally, conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic, and so on.

It has proven convenient at times, principally for reasons of common usage, to refer to these signals as bits, values, elements, symbols, characters, terms, numbers, or so on. It should be borne in mind, however, that these and similar terms are to be associated with the appropriate physical quantities and are merely convenient labels applied to these quantities. Unless specifically stated otherwise, it is appreciated that throughout the description, terms including processing, computing, calculating, determining, displaying, and so on, refer to actions and processes of a computer system, logic, processor, or similar electronic device that manipulates and transforms data represented as physical (electronic) quantities.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks. While the figures illustrate various actions occurring in serial, it is to be appreciated that various actions could occur concurrently, substantially in parallel, and/or at substantially different points in time.

The illustrated elements denote "processing blocks" that may be implemented in logic. In one example, the processing blocks may represent executable instructions that cause a computer, processor, and/or logic device to respond, to perform an action(s), to change states, and/or to make decisions. Thus, the described methodologies can be implemented as processor executable instructions and/or operations provided by a computer-readable medium. In another example, the processing blocks may represent functions and/or actions performed by functionally equivalent circuits including an analog circuit, a digital signal processor circuit, an application specific integrated circuit (ASIC), and so on. Flow diagrams illustrate functional information one skilled in the art could use to design/fabricate circuits, generate software, or use a combination of hardware and software to perform the illustrated processing.

Figure 1:
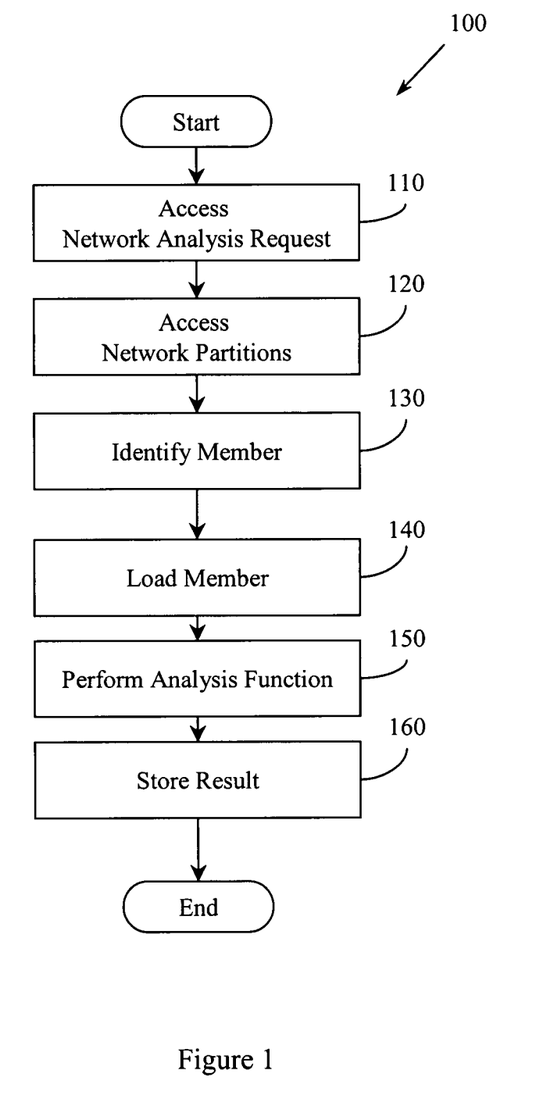
FIG. 1 illustrates an example method associated with load on demand network analysis.

FIG. 1 illustrates a method 100 associated with load on demand network analysis. Method 100 may include, at 110, accessing a network analysis request. The network analysis request may identify a network analysis function to be performed on a network. The network analysis function may seek to determine a path through a network, a cost for a certain path, whether certain nodes are connected, and so on. The network may be associated with problems in different spaces. For example, the network may be a geographic information system (GIS) network, a social network, a biologic network, a physical network, a logical network, and so on.

A GIS network may concern, for example, a road network, an air travel network, a routing configuration for cables in a building, and so on. A GIS network may include spatial information in the form of (x,y) coordinates and/or (x,y,z) coordinates. A social network may concern, for example, relationships between people. These people may have various communication technologies available and thus may engage in different types of communications. While two people may be geographically distant (e.g., United States and Asia) they may have a high-speed, reliable, communication path and thus may have a close communication proximity while having a distant spatial proximity. Conversely, two people may live one mile from each other but that mile may include a cultural, political, and/or geographic divide across which communications are practically impossible. Thus, these two people may be geographically close but may have a practically infinite communication proximity. Data describing a social network may therefore include information concerning communication proximity, geographic proximity, relationship proximity, and so on. A communication network may describe, for example, a computer network, a phone network, and so on.

As described above, networks in different spaces may store different information. However, this information may be abstracted into a model. Thus, a network for which a network analysis request is received may be associated with a network model. Recall that a network is a graph representation of a set of objects of interest and a set of relationships between objects of interest. One skilled in the art will appreciate that in some cases the terms "network" and "graph" may be used interchangeably. A data model may include, for example, a network metadata, a node table, a link table, a path table, and a partition table.

Network metadata may include information describing a network name, a network owner, hardware on which data associated with the network is to be stored, a network size, and so on. A node table may store data that describes nodes in the networks. Data describing a node may include a node identifier. A partition table may be node based and thus a partition table may use a node identifier as a foreign key to the node table. A link table may store data that describes links between nodes in the network. Links may be associated with nodes and may include information describing link cost, link reliability, link availability, and so on. A path table may store data that describes sets of links between nodes. A partition table may store data that describes subsets of nodes from the network, where a subset describes a partition of the network. The partition table stores node-partition relations (e.g., node identifier, partition identifier). The partition table may use a node identifier as a foreign key into a node table.

Method 100 may also include, at 120, accessing data associated with a set of network partitions that partition the network into two or more parts. This data may be stored, for example, in the node table, the link table, the path table, and/or the partition table. The information may facilitate identifying which partition(s) is relevant to the network analysis request. For example, if a request for driving directions between two nodes is received, then a partition associated with the origin and a partition associated with the destination may need to be identified. In one example, a road network may be partitioned by state.

Method 100 may also include, at 130, identifying a member of the set of network partitions associated with the network analysis request. In the driving directions example, the source and the destination may be in the same partition (e.g., trip starts and ends in Ohio), the source and the destination may be in neighboring partitions (e.g., trip starts in Ohio, ends in Kentucky), or the source and destination may not be in neighboring partitions (e.g., trip starts in Ohio, trip ends in Tennessee). To begin to respond to the network analysis request, one or more partitions may be identified as being relevant to the problem.

The network analysis functions may fall into different classes of functions including spatial analysis, path analysis, cost analysis, and so on. While three classes of analytic functions are described, it is to be appreciated that other analytic function classes may be employed. Specific network analysis functions may include, a shortest path function, an all paths function, a connected components function, a within-cost function, a nearest neighbor function, and a minimum cost spanning tree function. While six specific functions are described, it is to be appreciated that a greater and/or lesser number of functions may be employed.

With the relevant partitions identified, method 100 may proceed, at 140, with selectively loading data associated the member(s) into a memory associated with the processor. Rather than load the entire network, or rather than loading data that describes the entire network, only data describing the relevant member(s) is to be loaded. In the all-Ohio trip, loading data associated with one partition may be all that is required. In the Ohio-Kentucky trip, loading data associated with two partitions may be required. In one example, data associated with Ohio may be loaded and analyzed and then data associated with Kentucky may be loaded and analyzed.

In another example, when parallel processing is available, data associated with both Ohio and Kentucky may be loaded and processed substantially in parallel. In the Ohio-Tennessee trip example, loading data associated with multiple partitions may be required. Rather than load all the partitions at once, the partitions may be loaded as needed to support the network analysis function. For example, data associated with Ohio may be loaded first, then data associated with Kentucky, and finally data associated with Tennessee. Conventional systems may have loaded information associated with all three states and/or with all states for which information was available. Method 200 (FIG. 2) illustrates how memory may be managed when the amount of information to be loaded exceeds the memory capacity.

In one example, a previous request may have already caused a partition to be loaded into memory. For example, a user may have already received directions for a trip in Ohio. Thus, selectively loading data associated with the member may include first determining whether data associated with the member is already loaded. If it is already in memory, then it does not have to be retrieved from a database a second time. If it is not already in memory, then it may be retrieved. In different examples, data associated with a partition may be retrieved in different manners. In one example, data may be loaded individually on an element-by-element basis from one or more database tables. In another example, partition data may acquired collectively. Collective acquisition may be undertaken when, for example, the partition data is stored as a binary large object (BLOB). The BLOB may be created after a partition table is created. The BLOB may be, for example, the digital representation of the partition information. In one example, a partition BLOB table may store BLOBs that correspond to different portions of a partition table (e.g., different partitions). Thus, load time may be improved since collectively loading a digital representation may be faster than individually acquiring individual values from rows in tables.

With the relevant partition(s) identified and loaded, method 100 may proceed, at 150, with performing the network analysis function on the data associated with the member and may then conclude, at 160, by storing in a computer-readable medium a result obtained by performing the network analysis function on the member.

Figure 2:
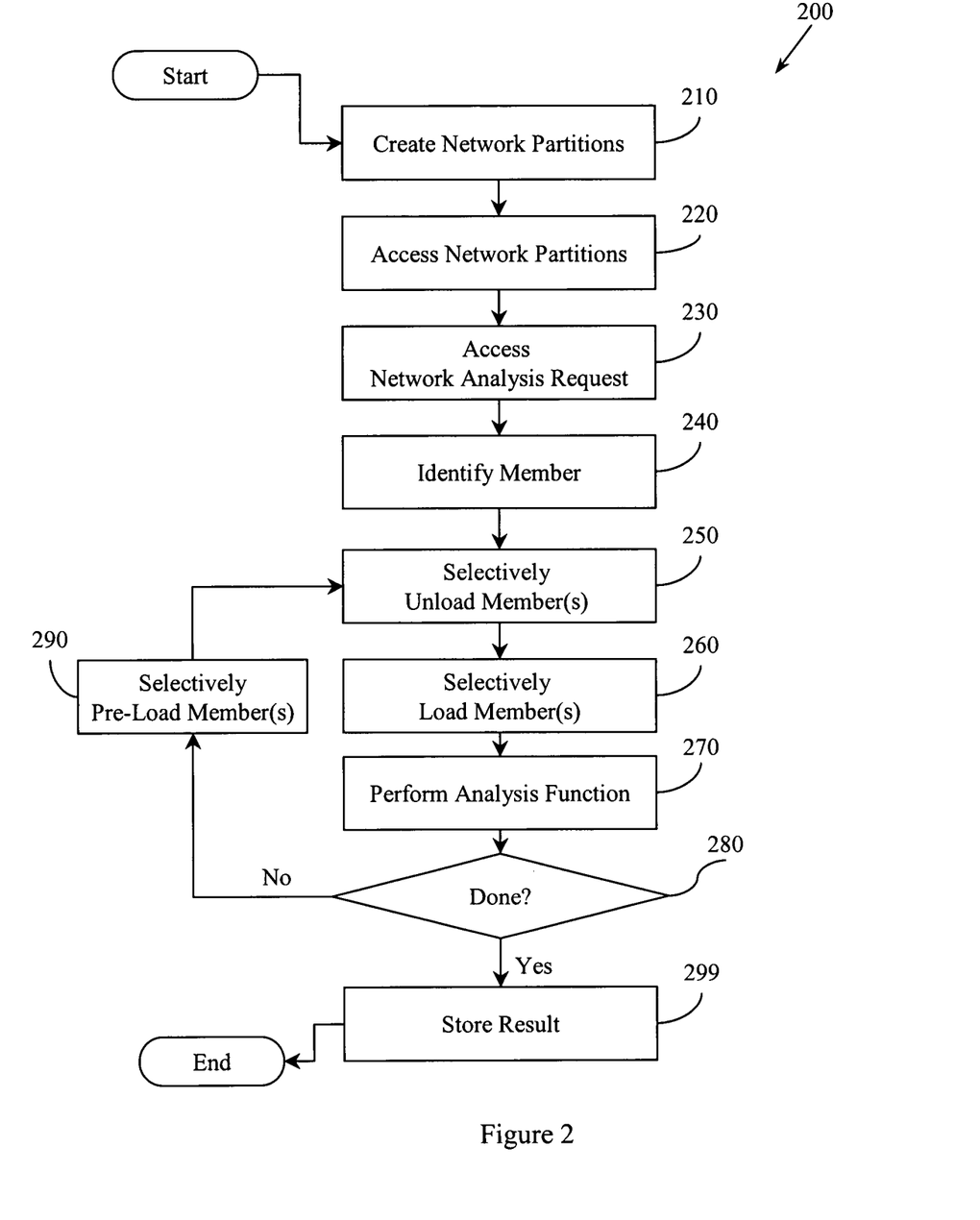
FIG. 2 illustrates an example method associated with load on demand network analysis.

FIG. 2 illustrates a method 200 associated with load on demand network analysis. Method 200 includes some actions similar to those described in connection with method 100 (FIG. 1). For example, method 200 includes accessing network partitions at 220, accessing a network analysis request at 230, identifying a member at 240, loading a member at 260, performing an analysis function at 270, and storing a result at 299. However, method 200 may include some additional actions.

For example, method 200 may include, at 210, creating the network partitions that are later accessed, loaded, and analyzed. Creating the partitions may include analyzing a graph representation of a network and determining certain spatial, cost, affinity, and other relationships. Nodes may be logically placed in a partition based, at least in part, on these relationships. Logically placing a node in a network partition may include storing data in a data structure, updating a data model, and so on. In one example, storing data associated with the set of network partitions may include automatically updating a partition table in a network data model and automatically updating a partition identifier associated with a node.

While automatic partition creation is described above, partition creation and thus data and/or data model updating may be based, at least in part, on user inputs. For example, a user may explicitly identify partitions to create, may provide parameters that guide partition selection, may provide information concerning the maximum/minimum size of a partition, and so on. Thus, user inputs may include a maximum number of nodes for a network partition, a network partition to remain loaded in the memory, and so on.

Computing systems do not have an infinite amount of memory. Thus, method 200 may also include, at 250, selectively unloading from memory data associated with a network partition. When a partition is to be loaded into memory and the memory is full, a partition that has already been loaded may be removed from memory. More generally, when a subsequent partition is to be loaded, a previously loaded partition may be unloaded. Partition replacement policies may include, for example, a least recently used policy, a most recently used policy, a least frequently used policy, and so on. Unloading a partition may make room for a subsequent partition to be loaded. In one example, a user may choose and/or define their own replacement policy. This replacement policy may be time based, frequency based, and so on. A replacement policy may, in different examples, evict a single partition and/or multiple partitions.

In one example, loading occurs on demand as needed. In another example, a partition(s) may be speculatively pre-loaded. This may facilitate reducing waiting time. Consider the Ohio-Tennessee driving directions example. At a first point in time partitions associated with Ohio and Tennessee may be loaded. While a network analysis function is being performed on these two partitions, a pre-load process may identify candidate partitions to link Ohio to Tennessee. In one example, a partition(s) (e.g., Kentucky, West Virginia, Indiana) may be pre-loaded. Whether a partition is pre-loaded may depend on user preferences, available memory, the architecture of a system running method 200, a relationship between a previously loaded partition and a partition to be loaded, and so on.

A decision may be made at 280 concerning whether method 200 should conclude. If the decision is Yes, then method 200 may store a result at 299 and then conclude. While storing a result at 299 is illustrated, it is to be appreciated that the computer-executable method 200 may additionally and/or alternatively, provide a result using, for example, a user interface (e.g., display).

If the decision at 280 is no, then method 200 may continue cycling through selectively pre-loading a partition at 290, selectively unloading a partition at 250, selectively loading a member at 260, and performing more analysis at 270.

While FIG. 2 illustrates various actions occurring in serial, it is to be appreciated that various actions illustrated in FIG. 2 could occur substantially in parallel. By way of illustration, a first process could access network partitions and analysis requests, a second process could load, unload and/or pre-load partitions, and a third process could perform network analysis. While three processes are described, it is to be appreciated that a greater and/or lesser number of processes could be employed and that lightweight processes, regular processes, threads, and other approaches could be employed.

Figure 3:
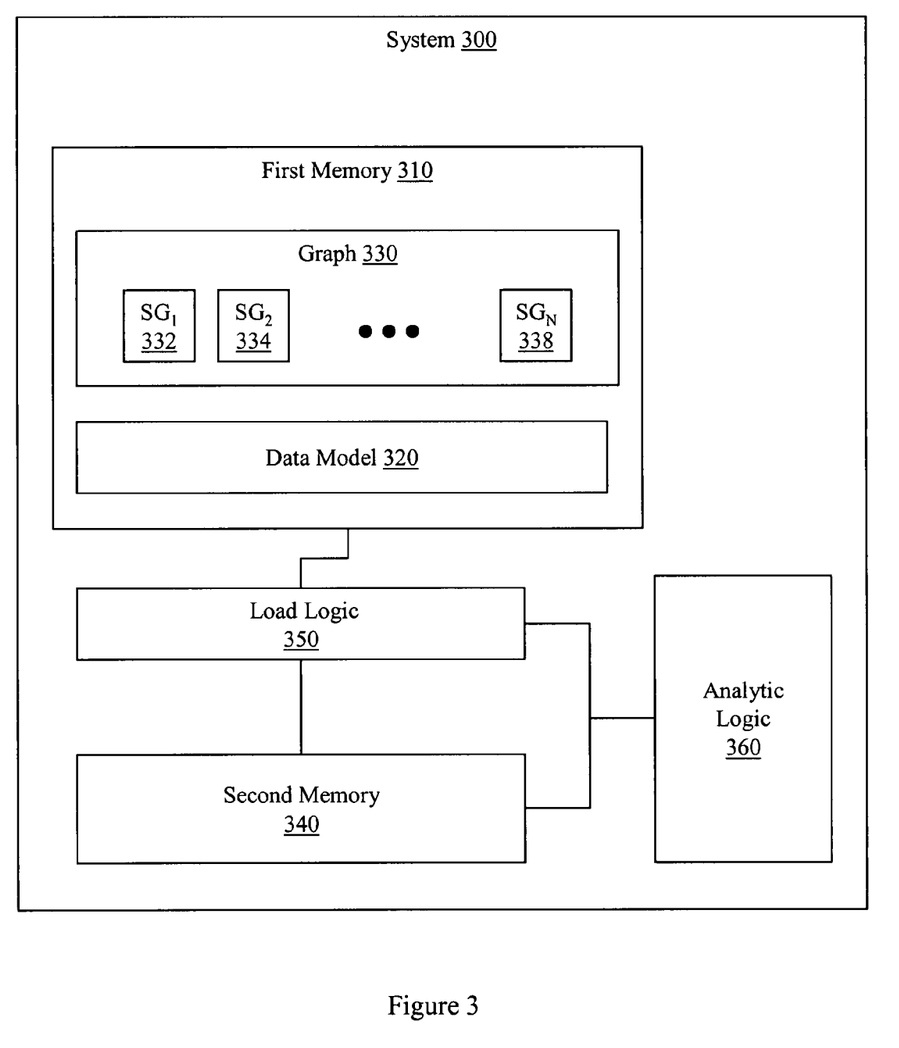
FIG. 3 illustrates an example system associated with load on demand network analysis.

FIG. 3 illustrates a system 300 associated with load on demand network analysis. System 300 may include a first memory 310 to store a data model 320. Data model 320 may include, for example, a graph metadata to describe a graph 330. The metadata may include, for example, a name, a location, a size, an owner, permissions, and so on. The data model 320 may also include a node table to store data describing nodes in the graph 330. The data model 320 may also include a link table to store data describing links in the graph 330 and a path table to store data describing paths in the graph 330.

The data model 320 may also include a sub-graph table to store data describing sub-graphs in the graph.

Memory 310 may also store data associated with graph 330. Graph 330 may be partitioned into a set of sub-graphs (e.g., $SG_1$ 332, $SG_2$ 334, ... $SG_N$ 338). Both the graph 330 and the sub-graphs may be described, at least in part, by data associated with the data model 320. Memory 310 may be, for example, a large capacity device(s) (e.g., tape, array of disks). Memory 310 may be able to store all the data associated with describing a graph.

System 300 may also include a second memory 340 to store data associated with a selected sub-graph upon which an analytic function is to be performed. Memory 340 may be located inside a computing system (e.g., server, personal computer, mobile computer) and may be operably connected to first memory 310. While first memory 310 may have enough capacity to store all data associated with a graph, second memory 340 may not be as large. Thus, system 300 may include a load logic 350 to selectively load data associated with a sub-graph into the second memory 340. Which data is to be loaded may depend, at least in part, on the analytic function to be performed on the sub-graph. After an analytic function is performed, load logic 350 may selectively unload data associated with a sub-graph from second memory 340 to make room for a subsequent set of data associated with a subsequent sub-graph to be processed.

System 300 may also include an analytic logic 360 to perform analytic functions on data stored in the second memory 340. The analytic function may be, for example, a cost function, a path function, a proximity function, and so on. Unlike conventional systems, load logic 350 may not provide all the data associated with a complete graph to analytic logic 360 through second memory 340. Instead, load logic 350 may provide a subset of relevant data.

Figure 4:
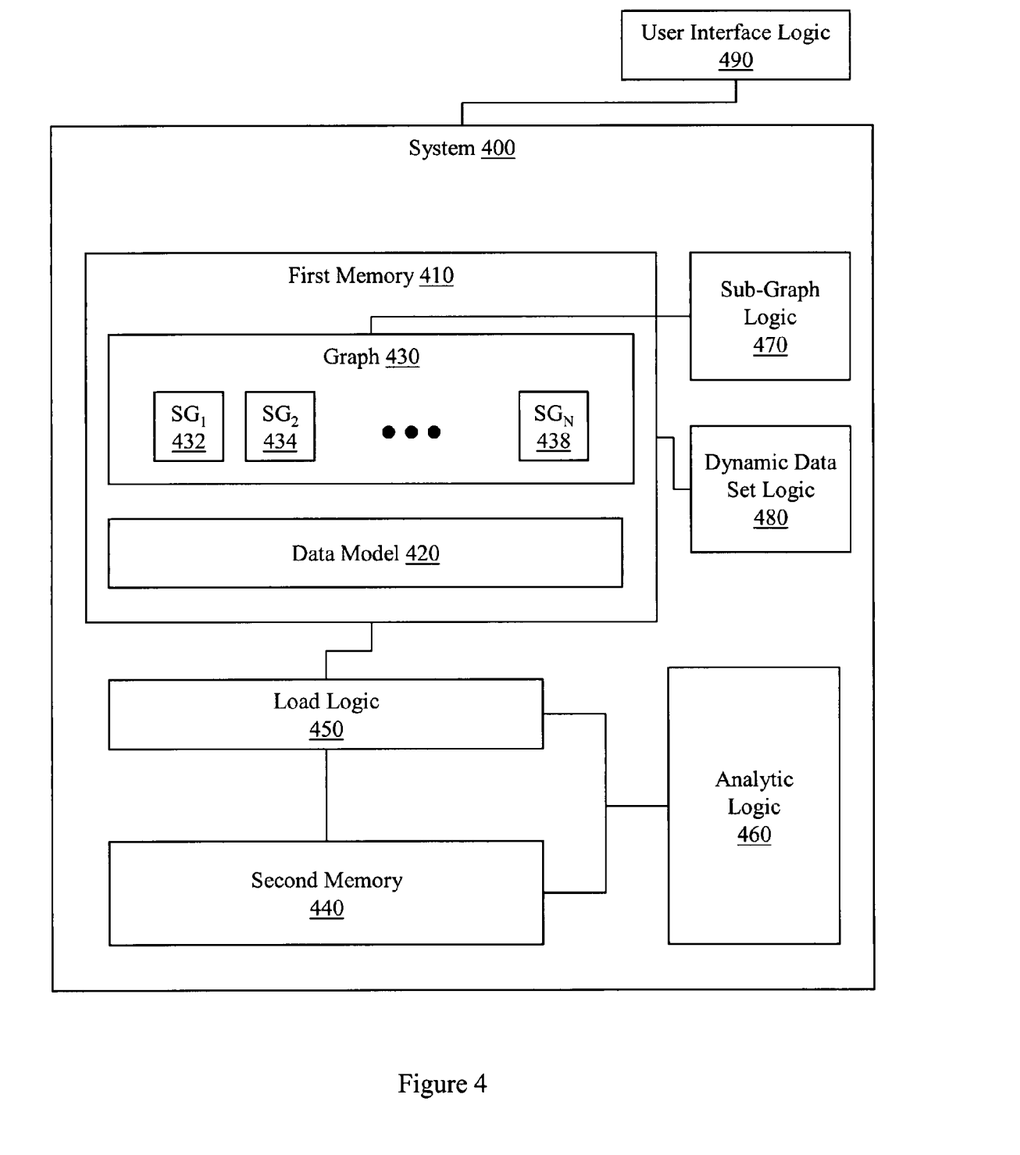
FIG. 4 illustrates an example system associated with load on demand network analysis.

FIG. 4 illustrates a system 400 associated with load on demand network analysis. System 400 includes several elements similar to those described in connection with system 300 (FIG. 3). For example, system 400 includes a first memory 410 that may store data associated with a graph 430 and a set of sub-graphs (e.g., $SG_1$ 432, $SG_2$ 434, ... $SG_N$ 434) that logically sub-divide the graph 430. First memory 410 may also store data associated with a data model 420 that describes the graph 430 and its sub-graphs. System 400 may also include a load logic 450 to selectively provide, on an as-needed (e.g., load-on-demand) basis, data associated with a selected sub-graph(s) to a second memory 440. This data may then be processed by analytic logic 460.

However, system 400 may include additional elements. For example, system 400 may include a sub-graph logic 470 to create the set of sub-graphs. Creating the set of sub-graphs may include gathering information concerning links between graph elements, paths between graph elements, a cost (e.g., time, dollars, complexity) for connecting graph elements, and so on. This information may then be analyzed to determine how to logically sub-divide a graph to achieve certain goals. In one example, the goals may be identified and/or characterized by a user.

System 400 may also include a dynamic data set logic 480. Dynamic data set logic 480 may identify a change(s) in the graph 430 and/or in the data that represents the graph 430. Dynamic data set logic 480 may selectively provide data concerning the change(s) to the load logic 450. For example, if the change(s) are associated with a sub-graph loaded by load logic 450, then the data may be provided. Thus, sub-graph data initially loaded by load logic 450 into second memory 440 may be updated with this "delta" data. Analytic logic 460 may therefore operate on up-to-date data. Dynamic data set logic 480 may also provide the delta data to the sub-graph logic 470 which may then update first memory 410.

System 400 may also include a user interface logic 490. User interface logic 490 may communicate inputs to system 400. The inputs may include, for example, a graph partitioning parameter (e.g., maximum number of nodes), a caching policy (e.g., least recently used), a loading policy (e.g., speculative), and so on. User interface logic 490 may also communicate outputs including, for example, the result of an analytic function performed on sub-graph data.

Figure 5:
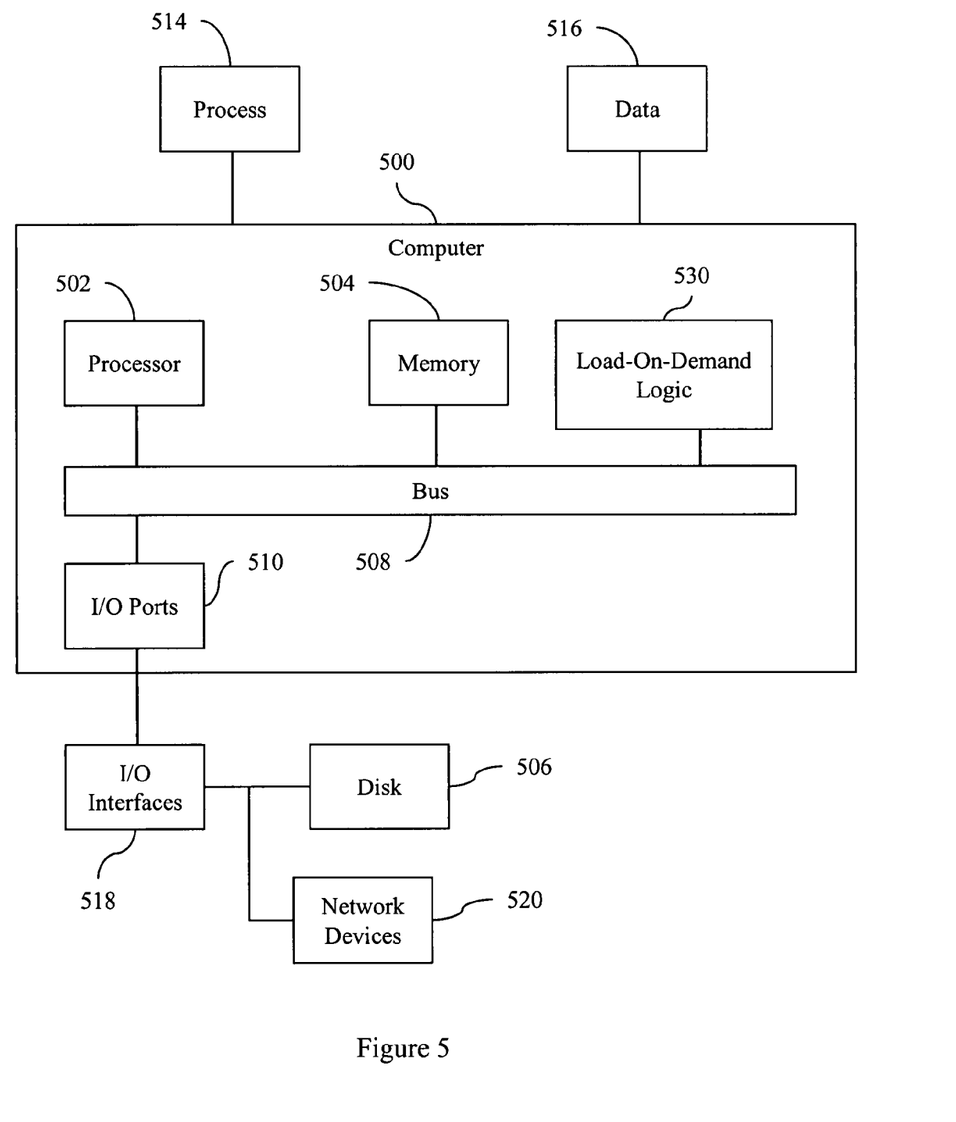
FIG. 5 illustrates an example computing environment in which example systems and methods illustrated herein can operate.

FIG. 5 illustrates an example computing device in which example systems and methods described herein, and equivalents, can operate. The example computing device may be a computer 500 that includes a processor 502, a memory 504, and input/output ports 510 operably connected by a bus 508. In one example, the computer 500 may include a load on demand logic 530. In one example, logic 530 may include means (e.g., hardware) for storing data concerning a network and a set of network partitions. The means may include memory, computer-readable media, and so on. Logic 530 may also include means (e.g., hardware, software in execution, firmware) for identifying a network partition upon which an analysis function is to be performed. The identifying may involve analyzing the stored data concerning the network and its set of partitions. Logic 530 may also include means (e.g., hardware, software in execution, firmware) for selectively loading data associated with an identified network partition. Thus, rather than load an entire network, logic 530 may identify a partition to load and then load on demand only a relevant partition(s) of the network. Logic 530 may also include means (e.g., hardware, firmware, software in execution) for performing the analysis function on the selectively loaded data.

Generally describing an example configuration of the computer 500, the processor 502 can be a variety of various processors including dual microprocessor and other multi-processor architectures. The memory 504 can include volatile memory and/or non-volatile memory. The non-volatile memory can include, but is not limited to, ROM, PROM, EPROM, EEPROM, and so on. Volatile memory can include, for example, RAM, synchronous RAM (SRAM), dynamic RAM (DRAM), synchronous DRAM (SDRAM), double data rate SDRAM (DDR SDRAM), and direct RAM bus RAM (DRRAM).

A disk 506 may be operably connected to the computer 500 via, for example, an input/output interface (e.g., card, device) 518 and an input/output port 510. The disk 506 can be, for example, a magnetic disk drive, a solid state disk drive, a floppy disk drive, a tape drive, a Zip drive, a flash memory card, a memory stick, and so on. Furthermore, the disk 506 may be an optical drive (e.g., CD-ROM, CD recordable drive (CD-R drive), CD rewriteable drive (CD-RW drive), digital video ROM drive (DVD ROM)). The memory 504 can store processes 514 and/or data 516, for example. The disk 506 and/or memory 504 can store an operating system that controls and allocates resources of the computer 500. Disk 506 and/or memory 504 may also store data 516.

The bus 508 can be a single internal bus interconnect architecture and/or other bus or mesh architectures. While a single bus is illustrated, it is to be appreciated that computer 500 may communicate with various devices, logics, and peripherals using other busses that are not illustrated (e.g., PCIE, SATA, Infiniband, 1394, USB, Ethernet). The bus 508 can be of a variety of types including, but not limited to, a memory bus or memory controller, a peripheral bus or external bus, a crossbar switch, and/or a local bus. The local bus can be of varieties including, but not limited to, an industrial standard architecture (ISA) bus, a microchannel architecture (MSA) bus, an extended ISA (EISA) bus, a peripheral component interconnect (PCI) bus, a universal serial (USB) bus, and a small computer systems interface (SCSI) bus.

The computer 500 may interact with input/output devices via i/o interfaces 518 and input/output ports 510. Input/output devices can include, but are not limited to, a keyboard, a microphone, a pointing and selection device, cameras, video cards, displays, disk 506, network devices 520, and so on. The input/output ports 510 can include but are not limited to, serial ports, parallel ports, and USB ports.

The computer 500 can operate in a network environment and thus may be connected to network devices 520 via the i/o devices 518, and/or the i/o ports 510. Through the network devices 520, the computer 500 may interact with a network. Through the network, the computer 500 may be logically connected to remote computers. The networks with which the computer 500 may interact include, but are not limited to, a local area network (LAN), a wide area network (WAN), and other networks. The network devices 520 can connect to LAN technologies including, but not limited to, fiber distributed data interface (FDDI), copper distributed data interface (CDDI), Ethernet (IEEE 802.3), token ring (IEEE 802.5), wireless computer communication (IEEE 802.11), Bluetooth (IEEE 802.15.1), and so on. Similarly, the network devices 520 can connect to WAN technologies including, but not limited to, point to point links, circuit switching networks (e.g., integrated services digital networks (ISDN), packet switching networks, digital subscriber lines (DSL)).

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Additional advantages and modifications will readily appear to those skilled in the art. Therefore, the invention is not limited to the specific details, the representative apparatus, and illustrative examples shown and described. This application is intended to embrace alterations, modifications, and variations that fall within the scope of the appended claims. Furthermore, the preceding description is not meant to limit the scope of the invention. Rather, the scope of the invention is to be determined by the appended claims and their equivalents.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

What is claimed is:

1. A non-transitory computer-readable medium storing processor executable instructions that when executed by a processor cause the processor to perform a method, the method comprising:

accessing, in a computer that includes the processor, a network analysis request to identify a network analysis function to be performed on a network, wherein the network is associated with a network model, and wherein the network is a graph representation of a set of objects of interest and a set of relationships between the objects of interest, wherein the network comprises a set of pre-defined network partitions that logically partition the network into two or more parts;

in response to receiving the network analysis request:
accessing, in a data store of the computer, data associated with the set of pre-defined network partitions;
identifying, in the data of the data store, one or more relevant partitions from the set of pre-defined network partitions that are relevant to the network analysis function associated with the network analysis request, wherein the identified one or more relevant partitions comprises a plurality of nodes from the network, and wherein the one or more relevant partitions are not pre-computed results from a previous network analysis request;
selectively loading, into a volatile memory of the computer, data representing the identified one or more relevant partitions, wherein the data of the one or more relevant partitions comprises a less-than-whole portion of the graph representation of the network, wherein the selectively loading includes dynamically loading the identified one or more relevant partitions while performing the network analysis function;
performing, in the computer, the network analysis function on the data of the one or more relevant partitions that is stored in the volatile memory; and
storing, in the computer, in a non-transitory computer-readable medium a result obtained by performing the network analysis function on the one or more relevant partitions, wherein the volatile memory and the data store are separate data storage mediums that are separately accessible.

2. The computer-readable medium of claim 1, the network model further comprising a network metadata, a node table, a link table, a path table, and a partition table.

3. The computer-readable medium of claim 2, where data describing a node associated with an object of interest includes a node identifier, the node identifier being a foreign key in the partition table.

4. The computer-readable medium of claim 2, the method including determining the set of pre-defined network partitions and storing data associated with the set of pre-defined network partitions.

5. The computer-readable medium of claim 4, where storing data associated with the set of pre-defined network partitions includes automatically updating the partition table in the network model, the updating being based, at least in part, on one or more user inputs.

6. The computer-readable medium of claim 5, the user inputs comprising a maximum number of nodes for defining a network partition, and a network partition to remain loaded in the memory.

7. The computer-readable medium of claim 1, where selectively loading data associated with the one or more relevant partitions includes loading data from a relational database upon determining that data associated with the one or more relevant partitions is not already loaded in the memory associated with the processor.

8. The computer-readable medium of claim 7, where loading data from the relational database includes acquiring a partition data as an aggregate, the partition data being stored as a binary large object (BLOB).

9. The computer-readable medium of claim 1, wherein the network being a geographic information system network, a social network, a biologic network, a physical network, or a logical network.

10. The computer-readable medium of claim 1, wherein the network analysis function includes a spatial analysis, a path analysis, or a cost analysis.

11. The computer-readable medium of claim 1, wherein the network analysis function includes a shortest path function, an all paths function, a connected components function, a within-cost function, a nearest neighbor function, or a minimum cost spanning tree function.

12. The computer-readable medium of claim 1, the method including selectively unloading one or more of the relevant partitions from the memory and loading on-demand a new partition to continue the network analysis function on the new partition.

13. The computer-readable medium of claim 1, where the one or more relevant partitions include at least a first partition and a second partition, and the method including selectively pre-loading data associated with the second partition into the memory based, at least in part, on a relationship between the second partition and the first partition where the first partition has been previously loaded.

14. The computer-readable medium of claim 1, where the network analysis request includes a user-specified network constraint.

15. A system, comprising:
a first memory configured to store a network data model and to store data associated with a graph, the graph comprising a set of pre-defined sub-graphs that partition the graph, the graph being described, at least in part, by data associated with the network data model, the pre-defined sub-graphs being described, at least in part, by data associated with the network data model, wherein the pre-defined sub-graphs comprise a plurality of nodes from the network data model;
a second memory configured to store data associated with a selected sub-graph upon which an analytic function is to be performed, wherein the second memory is a volatile memory and the first memory is a data store, and wherein the first memory and the second memory are separately accessible data storage mediums in a device;
a load logic configured to, in response to a request for the analytic function to be performed on the network data model, identify one or more relevant sub-graphs from the pre-defined sub-graphs that will be involved in the analytic function, wherein the one or more relevant sub-graphs are not pre-computed results of a previous request, and to selectively load data associated with the one or more relevant sub-graphs, which is a less-than-whole portion of the graph, into the second memory based, at least in part, on the analytic function to be performed, wherein the load logic is configured to selectively load by dynamically loading the one or more relevant sub-graphs while performing the analytic function; and
an analytic logic configured to perform the analytic function on the data associated with the one or more relevant sub-graphs in the second memory.

16. The system of claim 15, the network data model including a graph metadata to describe the graph, a node table to store data describing nodes in the graph, a link table to store data describing graph links, a path table to store data describing graph paths, and a sub-graph table to store data describing the pre-defined sub-graphs.

17. The system of claim 15, further including:
a dynamic data set logic configured to identify one or more changes in the graph and to selectively provide data concerning the one or more changes to the load logic.

18. The system of claim 15, further including:
a sub-graph logic configured to create the set of pre-defined sub-graphs, where creating a sub-graph includes manipulating data associated with the network data model and manipulating data in a sub-graph table.

19. The system of claim 15, further including:
a user interface logic configured to communicate inputs including a graph partitioning parameter, a caching policy, and a loading policy;
the user interface logic further configured to communicate outputs including an analytic function result.

20. A non-transitory computer-readable medium storing processor executable instructions that when executed by a processor cause the processor to perform a method, the method comprising:
creating, in a data store of a computer that includes the processor, a set of pre-defined network partitions that logically partition a graph representation of a network into two or more parts;
in response to receiving a network analysis request that includes a network function to be performed on the network:
identifying, in the data store, one or more relevant partitions from the set of pre-defined network partitions that are relevant to the network function, wherein the one or more relevant partitions comprises a plurality of nodes from the network, and wherein the one or more relevant partitions are not pre-computed results of a previous network analysis request;
loading data representing the identified relevant partitions into a volatile memory of the computer, wherein the data representing the identified relevant partitions comprises a less-than-whole portion of the graph representation of the network, and wherein the loading includes dynamically loading the one or more relevant partitions while performing the network analysis function;
unloading, from the memory, data representing other partitions not identified as the relevant partitions if the data is present in the memory;
performing the network analysis function on the less-than-whole portion of the graph representation of the network associated with the relevant partitions that is stored in the memory; and
storing, in a non-transitory computer-readable medium, a result obtained by performing the network analysis function on the relevant partitions, wherein the volatile memory and the data store are separate data storage mediums that are separately accessible.

21. A method, comprising:
storing, in a first memory in a computer, a network data model and storing data associated with a graph, the graph comprising a set of pre-defined sub-graphs that partition the graph, the graph being described, at least in part, by data associated with the network data model, wherein the pre-defined sub-graphs being described, at least in part, by data associated with the network data model, and wherein the pre-defined sub-graphs comprises a plurality of nodes from the network data model;
in response to a request for an analytic function to be performed on the network data model, identifying one or more relevant sub-graphs from the pre-defined sub-graphs that will be involved in the analytic function, wherein the one or more relevant sub-graphs are not pre-computed results of a previous request;
selectively loading, into a second memory in the computer, data associated with the one or more relevant sub-graphs based, at least in part, on the analytic function to be performed, wherein the one or more relevant sub-graphs are a less-than-whole portion of the graph, and wherein selectively loading includes dynamically loading the one or more relevant sub-graphs while performing the analytic function; and
performing the analytic function on the data associated with the one or more relevant sub-graphs in the second memory, wherein the first memory is a data store and the second memory is a volatile memory, and wherein the volatile memory and the data store are separate data storage mediums that are separately accessible.

22. A non-transitory computer-readable medium storing processor executable instructions that when executed by a processor cause the processor to perform a method, the method comprising:
storing, in a first memory in a computer, a network data model and storing data associated with a graph, the graph comprising a set of pre- defined sub-graphs that partition the graph, the graph being described, at least in part, by data associated with the network data model, wherein the pre-defined sub-graphs being described, at least in part, by data associated with the network data model, and wherein the pre-defined sub-graphs comprises a plurality of nodes from the network data model;
in response to a request for an analytic function to be performed on the network data model, identifying one or more relevant sub-graphs from the pre-defined sub-graphs that will be involved in the analytic function, wherein the one or more relevant sub-graphs are not pre-computed results of a previous request;
selectively loading, into a second memory in the computer, data associated with the one or more relevant sub-graphs based, at least in part, on the analytic function to be performed, wherein the one or more relevant sub-graphs are a less-than-whole portion of the graph, and wherein selectively loading includes dynamically loading the one or more relevant sub-graphs while performing the analytic function; and
performing the analytic function on the data associated with the one or more relevant sub-graphs in the second memory, wherein the first memory is a data store and the second memory is a volatile memory, and wherein the volatile memory and the data store are separate data storage mediums that are separately accessible.

* * * * *

UNITED STATES PATENT AND TRADEMARK OFFICE
CERTIFICATE OF CORRECTION

PATENT NO. : 8,429,199 B2  
APPLICATION NO. : 11/897704  
DATED : April 23, 2013  
INVENTOR(S) : Wang et al.

Page 1 of 1

It is certified that error appears in the above-identified patent and that said Letters Patent is hereby corrected as shown below:

In the Specification:

In column 10, line 7, delete "i/o" and insert -- I/O --, therefor.

In column 10, line 14, delete "i/o" and insert -- I/O --, therefor.

In column 10, line 15, delete "i/o" and insert -- I/O --, therefor.

Signed and Sealed this  
Sixth Day of August, 2013

Teresa Stanek Rea  
*Acting Director of the United States Patent and Trademark Office*